United States Patent [19]
Kronberg

[11] Patent Number: 5,499,597
[45] Date of Patent: Mar. 19, 1996

[54] OPTICAL TEMPERATURE INDICATOR USING THERMOCHROMIC SEMICONDUCTORS

[76] Inventor: James W. Kronberg, 108 Independent Blvd., Aiken, S.C. 29801

[21] Appl. No.: 367,605

[22] Filed: Jan. 3, 1995

Related U.S. Application Data

[63] Continuation-in-part of Ser. No. 332,068, Nov. 1, 1994.

[51] Int. Cl.$^6$ ............................. G01K 1/02; G01K 11/12
[52] U.S. Cl. ..................... 116/216; 252/962; 252/408.1; 374/162
[58] Field of Search ............................ 374/162; 116/216; 252/962, 408.1

[56] References Cited

U.S. PATENT DOCUMENTS

| | | | |
|---|---|---|---|
| 1,657,103 | 1/1928 | Berger | 116/216 |
| 1,924,793 | 8/1933 | Laske | 106/287.18 |
| 2,308,087 | 1/1943 | Lappala | 116/216 |
| 2,945,305 | 7/1960 | Strickler | 374/162 |
| 3,348,917 | 10/1967 | Nestor | 116/207 |
| 3,352,794 | 11/1967 | Abdo | 374/162 |
| 3,561,269 | 2/1971 | Seitz | 374/162 |
| 3,781,523 | 12/1973 | Borom | 252/408.1 |
| 3,822,594 | 7/1974 | Parker | 374/161 |
| 3,898,354 | 8/1975 | Parker | 374/162 |
| 4,105,583 | 8/1978 | Glover et al. | 116/207 |
| 4,268,413 | 5/1981 | Dabisch | 116/216 |
| 4,278,349 | 7/1981 | Sander | 374/162 |
| 4,283,113 | 8/1981 | Eden | 356/5 |
| 4,424,990 | 1/1984 | White et al. | 116/207 |
| 4,509,533 | 4/1985 | Chervitz | 374/162 |
| 4,629,330 | 12/1986 | Nichols | 116/216 |
| 4,863,282 | 9/1989 | Rickson | 374/162 |
| 4,945,919 | 8/1990 | Hattori | 374/162 |
| 5,008,136 | 4/1991 | Chamberlain | 374/161 |
| 5,165,797 | 11/1992 | Kuroda et al. | 374/162 |

OTHER PUBLICATIONS

Day, Jesse H., "Thermochromism of Inorganic Compounds," Chemical Reviews, pp. 649–657 (Nov. 25, 1968).

*Primary Examiner*—Diego F. F. Gutierrez
*Attorney, Agent, or Firm*—Brian Tumm; Harold Dixon; William R. Moser

[57] ABSTRACT

A reversible optical temperature indicator utilizes thermochromic semiconductors which vary in color in response to various temperature levels. The thermochromic material is enclosed in an enamel which provides protection and prevents breakdown at higher temperatures. Cadmium sulfide is the preferred semiconductor material. The indicator may be utilized as a sign or in a striped arrangement to clearly provide a warning to a user. The various color responses provide multiple levels of alarm.

18 Claims, 2 Drawing Sheets

OPTICAL TEMPERATURE INDICATOR USING THERMOCHROMIC SEMICONDUCTORS

This application is a continuation-in-part of pending U.S. patent application Ser. No. 08/332,068, filed Nov. 1, 1994 entitled "Optical Temperature Sensor Using Thermochromic Semiconductors" (DOE File No. S-79,559).

BACKGROUND OF THE INVENTION

1. Field of the Invention

The present invention relates to an apparatus for indicating temperature at several different values. In particular, a thermochromic semiconductor is utilized which changes its color or absorbance in response to temperature. This color change provides an indication of danger and the degree of danger to an individual. The United States Government has rights in this invention pursuant to Contract No. DE-AC09-89R18035 between the United States Department Of Energy and Westinghouse Savannah River Company.

2. Discussion of Background

Burn injuries to human skin and other tissues can occur at temperatures above 100 degrees Celsius (212 degrees Fahrenheit) and occasionally at temperatures as low as 60 degrees Celsius (140 degrees Fahrenheit). Many human activities involve objects or surfaces heated into this range. Range top cooking, for example, uses a hot stove eye or griddle surface. Electronic component assembly often requires a heated soldering iron or soldering gun. In some cases these surfaces are hot enough to glow, providing a built-in warning of high temperature. However, incandescence bright enough to be seen in normal room lighting appears only when the temperature is between 500 to 700 degrees Celsius. Where the heated objects or surfaces have temperatures above 60 degrees Celsius but below noticeable incandescence, there is a potential for burn injury yet no obvious visible sign warns of this danger.

A number of temperature indicating devices have been devised to warn of high temperatures. The most familiar are glass thermometers which usually contain mercury, dyed alcohol or liquid gallium alloys. These thermometers are not practical for measuring the temperature of surfaces because they are mechanically fragile. Dial thermometers, usually driven by bimetallic strips, are more rugged but still subject to damage or calibration loss because of their mechanical complexity. Thermocouples and thermistors are still more rugged, but the electronics needed to linearize and display the temperature of such a device is too costly and bulky for many applications.

Other materials which may be used to indicate temperature are those which melt or soften predictably with temperature. One example is pyrometric cones which are used chiefly in ceramics. These cones are compounds of clays and glassy materials which soften and bend over at known temperatures ranging upward from about 600 degrees Celsius. More recently, materials which melt at lower temperatures have been sold commercially by the name Stik™. These Stiks™ look chalky up to their melting points and become glossy at higher temperatures. Up to about 150 degrees Celsius, such materials may also be used to make self-adhesive labels with dots which change color, usually from white to black, when they melt. Once a cone, Stik™ or label dot has melted, the indication is permanent and the temperature indicator cannot be reused.

Another group of usable temperature indicating materials are those which change their colors, rather than their shapes or mechanical properties, with temperature. These materials are called thermochromic. The most familiar thermochromic material is liquid crystals which can be formulated to respond over narrow temperature ranges from 0 to 60 degrees Celsius. Liquid crystals are synthetic derivatives of cholesterol. Liquid crystals are intrinsically colorless, but the ordering causes a response like three-dimensional diffraction gratings.

Cupromercuric iodide is another thermochromic material which undergoes a change in crystal form and hence in color at or near 67 degrees Celsius. The red form is stable below 67 degrees Celsius and the second, brown form is stable above that temperature.

Both liquid crystals and cupromercuric iodide provide reversible temperature indications within their normal temperature ranges, but are readily decomposed by temperatures very much above their operating ranges. Therefore, these indicators are unusable for providing a warning for most surfaces which may become hot enough to cause burns.

A more detailed description of various thermochromic materials is given in pending U.S. patent application Ser. No. 08/332,068, filed Nov. 1, 1994, entitled Optical Temperature Sensor Using Thermochromic Semiconductors (S-79,559) which is hereby incorporated by reference.

SUMMARY OF THE INVENTION

According to its major aspects this invention is a composition to indicate temperature by utilizing thermochromic semiconductor material.

Another object of the invention is to place the thermochromic semiconductor material within an enamel or glass matrix to allow reversible indications of high temperatures without destroying the semiconductor material.

Another object of the invention is to use the various color changes of the thermochromic semiconductor material to provide a multi-level response to indicate the various levels of temperature.

Another object of the invention is to mount the temperature indicator directly upon a range top eye or other surface which requires a temperature indication.

Another object of the invention is to utilize the thermochromic semiconductor with a proper background to form a sign which is viewable only at or above a predetermined dangerous temperature.

A further preferred object of the invention is to utilize cadmium sulfide as the thermochromic temperature indicator material.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

Figure 1:
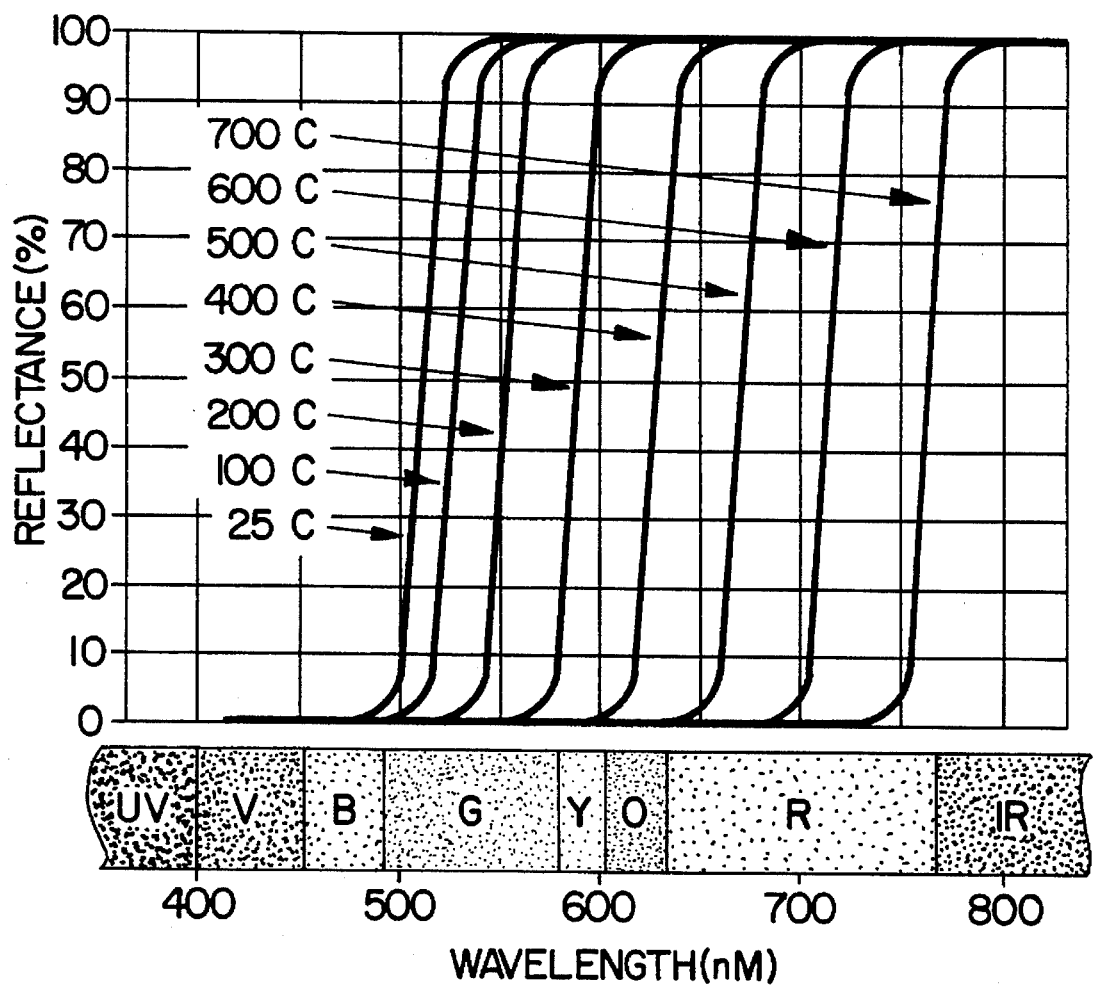
FIG. 1 is a graph showing the reflectance of cadmium sulfide as a function of the wavelength of light.

A new class of materials consists of thermochromic semiconductor materials whose band gaps lie in the energy range of visible light and change reproducibly in response to variations in temperature. This is in contrast to the prior art which utilizes measuring devices, bimetallic strips or elements which deform in response to temperature.

Thermochromic semiconductor materials include cadmium-zinc sulfo-selenides as shown by the following formula $Cd_y Zn_{(1-y)} S_b Se_{(1-b)}$ where Cd represents cadmium, Zn represents zinc, S represents sulfur, Se represents selenium and the value of y ranges from 0.5 to 1.0 and the value of b ranges from 0.5 to 1.0.

A broader group of thermochromic semiconductors are defined by the formula $Hg_x Cd_y Zn_{(1-x-y)} S_b Se_{(1-b)}$ where Hg represents mercury, Cd represents Cadmium, Zn represents zinc, S represents sulfur and Se represents selenium. Further, the value of x ranges from 0.0 to 1.0, the value of y ranges from 0.0 to 1.0 and the value of b ranges from 0.5 to 1.0. This formula includes semiconductors containing mercury which are much different in composition and properties to the mercury iodide which is well known in the prior art.

A more comprehensive definition of thermochromic semiconductors is found from the formula $Zn_x Cd_y Hg_{(1-x-y)} O_a S_b Se_c Te_{(1-a-b-c)}$ where the value of x is from 0.0 to 0.5, the value of y is from 0.5 to 1.0, the value of a is from 0.0 to 0.5, the value of b is from 0.5 to 1.0 and the value of t is from 0.0 to 0.5. In the above equation, O represents oxygen and Te represents tellurium. The other symbols represent the same elements set forth in the equation of the previous paragraph.

Only those compositions which are isostructural with pure cadmium sulfide (i.e. with the hexagonal wurtzite structure) are useful herein. The term "isostructural" as used herein refers to a particular arrangement of metal (Zn, Cd, Hg) atoms and nonmetal (O, S, Se, Te) atoms in the crystal lattice, regardless of the actual proportions of elements present. The term wurtzite structure refers to a specific hexagonal lattice arrangement first identified in the zinc ore wurtzite. Wurtzite may be defined as a brownish black mineral ZnS that consists of zinc sulfide in hemimorphic hexagonal crystals or a fibrous state and that is polymorphous with sphalerite. The term cadmium compound as used herein may refer to any of the compositions defined by the preceding formulas, even where no actual cadmium may be present (i.e., y=0).

Further, equimolar amounts of elements taken from column IIB and column VIA of the periodic table combine to form the thermochromic semiconductors mentioned in the above formulas, provided the hexagonal wurtzite structure is present.

Cuprous oxide $Cu_2O$ is another thermochromic semiconductor which has an absorption edge near the red end of the spectrum and appears deep blood red.

Cadmium sulfide CdS, the preferred embodiment, has an optical absorption edge within the visible spectrum and its color changes reproducibly as a function of temperature to provide contrasting colors with increasing temperature and danger. The absorption edge of cadmium sulfide is in the blue-green at room temperature but moves steadily to lower energies as the temperature rises. As a result, the color of cadmium sulfide changes from a bright yellow at room temperature through orange, progressively darker reds, and finally to black around the onset of incandescence.

At high temperatures thermochromic cadmium compounds will undergo air oxidation, losing their colors. If, however, the material is surrounded with a glass matrix or ceramic composition, air will be sealed out and the material may be taken to high temperatures without breaking down. Surrounding the semiconductor material with an enamel or ceramic composition also serves a second purpose. The material is prevented from leaching out of the matrix.

The temperature induced color change of thermochromic semiconductors results from a common property. The permitted energy bands change as a function of temperature, typically broadening as the semiconductor material grows hotter. As a result, the band gap progressively narrows, so that photons with lower and lower energies may be absorbed and boost electrons into the conduction band. The absorption edge thus moves with temperature, allowing more and more photons to be absorbed. This effect is explained in more detail in parent U.S. application Ser. No. 08/332,068, filed Nov. 1, 1994, entitled "Optical Temperature Sensor Using Thermochromic Semiconductors" which is hereby incorporated by reference.

When suitably protected cadmium sulfide or another thermochromic semiconductor is placed in an area or in contact with an object to indicate temperature, the spectral reflectance will change as a function of temperature. FIG. 1 shows a drawing indicating the reflectance of cadmium sulfide as a function of the wavelength of light as set forth in the table which follows:

| Curve | Temperature (Kelvin) | Wavelength (Nanometers 50%) |
| --- | --- | --- |
| A | 0 | 483 |
| B | 300 | 512 |
| C | 400 | 532 |
| D | 500 | 559 |
| E | 600 | 586 |
| F | 700 | 622 |
| G | 800 | 664 |
| H | 900 | 712 |
| I | 1000 | 780 |

Virtually any thermochromic semiconductor may be used in this invention, but thermochromic cadmium compounds have the ability to produce multiple color changes in the visible spectrum so they may be viewed and provide different warning levels.

Figure 2:
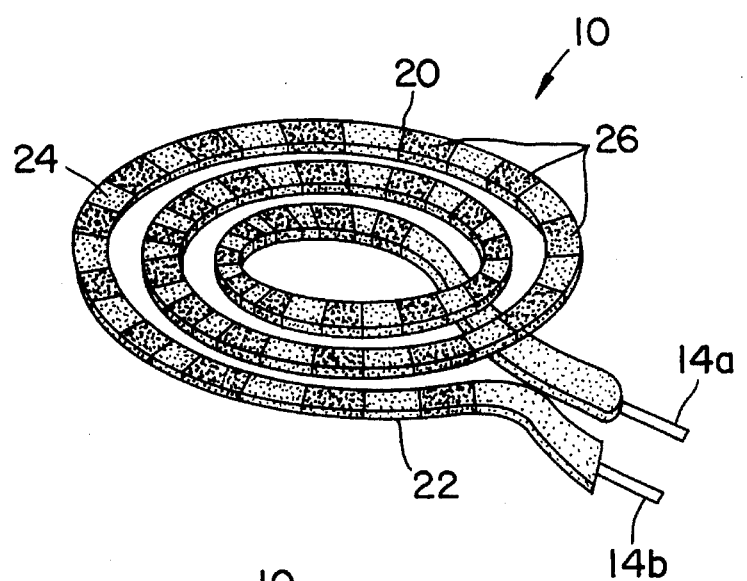
FIG. 2 is a first embodiment of the invention which includes colored bands applied to a range top eye to indicate its temperature.

A first embodiment of the invention is an electric range top eye with a built-in automatic hot warning. FIG. 2 shows the range top eye in perspective, while FIG. 3 enlarges a small cross-section to show more detail.

A range top eye or other cartridge-type, sealed electric heater generally consists of three concentric layers. The innermost layer is an electrically resistive element 12 which is typically a wire of Nichrome™ (80% nickel, 20% chromium) or a like alloy. This wire may be straight, coiled, or doubled back upon itself depending on the application. The ends 14a, 14b form electrical connections.

Figure 3:
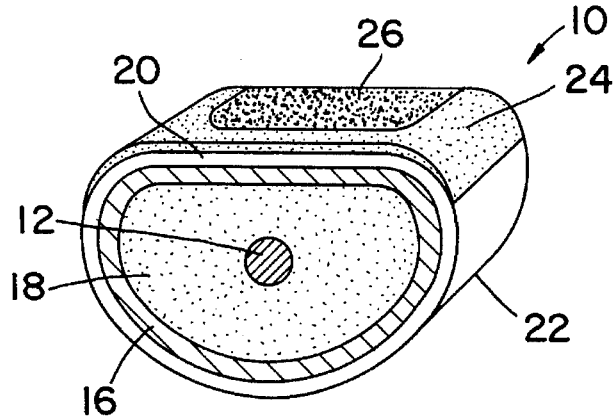
FIG. 3 is another view of the embodiment of FIG. 2.

To make such a heater, the resistive element or wire 12 is inserted into a tube 16 made of stainless steel (typically 15% nickel, 20% chromium and 65% iron) or, for higher temperatures, Inconel™ (typically 76% nickel, 16% chromium and 8% iron), leaving its ends 14a, 14b free as shown in FIGS. 2 and 3. The space between element 12 and tube 16 is filled with thermally conductive, electrically insulating material 18 such as magnesium oxide. Next, tube 16 is swaged to a smaller diameter in order to compact the oxide and form the desired cross-section(circular or otherwise). The assembly is then bent into its final shape. For a range eye, the desired cross-section is roughly elliptical with one side 20 flattened as shown in FIG. 3. The final shape is usually a flat spiral in which side 20 faces upward to contact and support the objects to be heated.

The present invention adds two, or optionally three layers to the outside of the tube 16. These layers provide an indication of a dangerous temperature even before the range top eye begins to emit a visible glow.

First, and optionally if needed for strong adhesion of the following layers, a bonding layer 22 of vitreous enamel heavily loaded with cobalt oxide is added as shown in FIG. 3. Such a layer is needed when enameling mild steel, but may not give significant benefits on stainless steel. The cobalt oxide content typically makes such enamel a deep blue-black color. Layer 22 may be applied over the entire surface of tube 16 or only over upper surface 20, depending upon the convenience in applying the layer.

Next a layer 24 of vitreous enamel whose color closely matches the slightly orangish yellow color of cadmium sulfide at room temperature is applied. This enamel may be made, for example, by properly combining oxides of lead, antimony and a small amount of cerium or tin in a predominantly silicate melt. The result is a bright, opaque yellow color formed by finely divided lead diantimonate, $Pb_2Sb_2O_7$. Depending upon the particle size, this vitreous enamel may or may not have an orangish tint. If the enamel is too yellow, it may be reddened by adding a small amount of iron oxide. Alternatively, any one of several other well known methods for making an orange yellow enamel, not containing CdS or a related thermochromic semiconductor material, may be used.

Layer 24 also preferably contains a large proportion of some material which will devitrify and form a refractory solid after prolonged heating. For example, zinc oxide will have this property. Upon fusion in a silicate melt, the material will react with the silica to form crystalline willemite which is a particular crystal form of zinc orthosilicate, $Zn_2SiO_4$, and relatively insoluble in molten silicates. Therefore the material will become molten again only well above the intended working temperature of the device.

The presence of mostly infusible material will help keep the hot enamel from melting and sticking to other surfaces which come into contact therewith. The specific advantage of generating this material through devitrification is that the coating is easy to apply and fully surrounds the coloring material which provides isolation from the environment. A conventional ceramic coating may not provide this isolation. Since initial fusion with all components present would allow premature formation of the crystalline phase, one of the ingredients which react to form the crystalline phase will need to be withheld until later.

A preferred composition for the unfired coating will thus consist of approximately equal weight proportions of zinc oxide and of a pre-fused yellow vitreous enamel consisting, for example, of the mixed oxides of silicon, lead, antimony, and tin or cerium, with silicon predominating the composition. On fusion, the zinc oxide will dissolve in the remelted enamel, then reprecipitate as willemite $Zn_2SiO_4$ to form a two-phase, nonporous coating whose low-melting glass phase is enclosed by a predominantly crystalline structure. The enamel composition should be such that the thermal expansion coefficient of the crystallized coating will match that of tube 16.

Crystallizing willemite tends to push out and exclude impurities found in the melt. For an even distribution of color in the finished vitreous enamel, a great many small crystals per unit area are preferable to a few larger ones. This may be achieved by adding a small amount of powdered willemite, or of previously fired enamel containing it, to the enamel component of layer 24 before the final firing.

Applied to the surface of layer 24 is a discontinuous layer 26 of a second enamel, similar in composition and firing behavior to that of layer 24 except that its coloring material is a cadmium compound, such as cadmium sulfide, rather than lead diantimonate or another non-thermochromic glass coloring agent. Preferably, this layer is applied in a distinctive pattern with areas of enamel 26 alternating with exposed regions of enamel 24 and bounded by distinct edges. For instance, enamel 26 could be applied in rectangular spots or stripes running across the surface 20 of the finished range eye. Alternatively, the two coloring agents used in layers 24 and 26 may be interchanged.

Vitreous enamels are inorganic compositions usually composed of mixed oxides with $SiO_2$ predominating, intended to be applied by fusing onto a metallic surface, and optionally colored and/or opacified by the additions of other materials either dissolved or existing as separate phases. Examples of vitreous enamels include, but are not limited to glass material and ceramic material.

Figure 4:
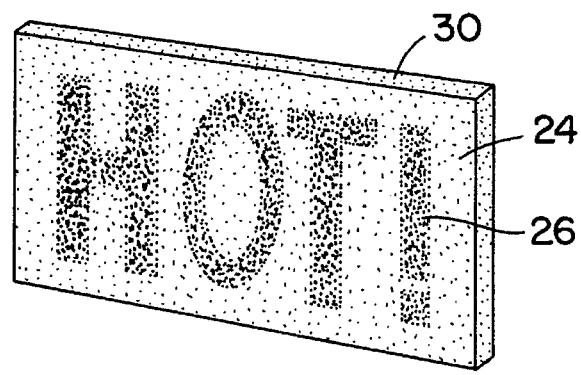
FIG. 4 is a placard designed to be affixed to any surface or object to indicate a dangerous temperature.

A second embodiment of the invention shown in FIG. 4 comprises a placard or sign 30 designed to be affixed to any surface or object which becomes hot enough to have burn potential. The placard may be made from heat resisting and heat conductive metal, such as copper or stainless steel. The placard may have any convenient shape and size. The previously described enamels again form layers 24 and 26 in a pattern of alternating exposed areas. A crystallizing ingredient may or may not be used, depending upon the expected maximum operating temperature and the probability of contact between the placard and other surfaces.

The alternating exposed areas for the placard may comprise stripes, symbols, shapes, indicia or other designs. Alternatively, and as shown in FIG. 4, layer 26 may form the shapes of letters spelling out the word "HOT!". This word will be invisible at room temperature, but will become more and more obvious as the placard grows hotter. The letters will first become orange, then red, and finally black against the relatively unchanging yellow background. This provides a graded or level response as to the danger involved. The amount of contrast between the two areas reflects the temperature and degree of burn danger. Further, the color scheme provides a graded alarm also. The yellow color at room temperature indicates the surface sometimes gets hot. The orange color indicates caution. The red color indicates danger. Lastly, the black color indicates great danger. When combined with relatively unchanging yellow stripes, these colors stand out even more. Therefore, the signals are even more noticeable.

Examples of devices which may utilize this invention include, but are not limited to: range top eyes, griddles and other cooking surfaces, cookware, hair curling irons, soldering irons, bearings in moving machinery, engine parts (particularly on stationary equipment such as generators), arc and plasma welding and cutting tools, autoclaves, industrial chemical process vessels and piping, and plastics injection molding and metal die-casting gear.

It will be apparent to those having ordinary skill in the art that many changes and modifications can be made to the foregoing description of the preferred embodiment without departing from the spirit and scope of the invention, as defined by the appended claims.

What is claimed:

1. An optical temperature indicator comprising:

a thermochromic semiconductor material;

said thermochromic semiconductor material being contained within a first vitreous enamel and coated as indicia on a sign so that increased temperature causes the thermochromic semiconductor material to reversibly change color in response to variations in temperature to provide a warning;

a second vitreous enamel;

said second vitreous enamel surrounding said indicia and covering the other surfaces of the sign;

said second vitreous enamel having a color which does not change significantly in response to temperature.

2. The optical temperature indicator of claim 1, wherein said thermochromic semiconductor material is defined by the formula $Cd_yZn_{(1-y)}S_bSe_{(1-b)}$ where Cd represents cadmium, Zn represents zinc, S represents sulfur and Se represents selenium; and the value of y ranges from 0.5 to 1.0 and the value of b ranges from 0.5 to 1.0.

3. The optical temperature indicator of claim 1, wherein said first vitreous enamel comprises a glass material.

4. The optical temperature indicator of claim 1, wherein said first vitreous enamel comprises a ceramic material.

5. The optical temperature indicator of claim 1, wherein said indicia comprise letters on the sign so that increased temperature causes the color to change and a message to appear.

6. The optical temperature indicator of claim 5, wherein said letters being invisible at room temperature, the colors of said first and second vitreous enamels being substantially identical;

said letters appearing orange at a first temperature above said room temperature;

said letters appearing red at a second temperature greater than said first temperature; and said letters appearing black at a third temperature greater than said first temperature.

7. The optical temperature indicator of claim 1, wherein said indicia appears yellow at room temperature;

said indicia being orange at a first temperature above room temperature;

said indicia being red at a second temperature which is greater than said first temperature; and said indicia being black at a third temperature which is greater than said second temperature.

8. The optical temperature indicator of claim 1, wherein said first vitreous enamel and said second enamel are alternated in a striped fashion on said surface.

9. The optical temperature sensor of claim 1, wherein said first and second vitreous enamels provide a similar yellow color at room temperature.

10. An optical temperature indicator comprising:

a thermochromic semiconductor material defined by the formula $Zn_xCd_yHg_{(1-x-y)}O_aS_bSe_cTe_{(1-a-b-c)}$ where Zn represents zinc, Cd represents Cadmium, Hg represents mercury, O represents oxygen, S represents sulfur, Se represents selenium and Te represents tellurium; and the value of x is from 0.0 to 0.5, the value of y is from 0.5 to 1.0, the value of a is from 0.0 to 0.5, the value of b is from 0.5 to 1.0 and the value of c is from 0.0 to 0.5;

said thermochromic semiconductor material being contained within a first vitreous enamel and coated as indicia on a surface so that increased temperature causes the thermochromic semiconductor material to reversibly change color in response to variations in temperature to provide a warning;

a second vitreous enamel surrounding said indicia and covering other portions of the surface;

said second vitreous enamel having a color which does not change significantly in response to temperature.

11. The optical temperature indicator of claim 10, wherein said indicia appears yellow at room temperature;

said indicia being orange at a first temperature above room temperature;

said indicia being red at a second temperature which is greater than said first temperature; and said indicia being black at a third temperature which is greater than said second temperature.

12. The optical temperature indicator of claim 10, wherein said surface comprises a range top grill.

13. The optical temperature indicator of claim 10, wherein said indicia comprises letters so that increased temperature causes the color to change and a message to appear.

14. The optical temperature indicator of claim 13, wherein said letters appearing invisible at room temperature, the colors of said first and second vitreous enamels being substantially identical;

said letters appearing orange at a first temperature above said room temperature;

and said letters appearing red at a second temperature greater than said first temperature.

15. An optical temperature indicator comprising:

a thermochromic semiconductor material defined by the formula $Hg_xCd_yZn_{(1-x-y)}S_bSe_{(1-b)}$ where Hg represents mercury, Cd represents Cadmium, Zn represents zinc, S represents sulfur and Se represents selenium; and the value of x ranges from 0.0 to 1.0, the value of y ranges from 0.0 to 1.0 and the value of b ranges from 0.5 to 1.0;

said thermochromic semiconductor material being contained within a first vitreous enamel and coated as letters on a sign such that increased temperature causes the thermochromic semiconductor material to reversibly change color in response to variations in temperature to provide a graded warning;

a second vitreous enamel comprising oxides of lead and antimony, said second vitreous enamel surrounding said letters and covering other portions of the sign;

said second vitreous enamel having a color which does not change significantly in response to temperature;

said letters being yellow at room temperature;

said letters being orange at a first temperature above room temperature;

said letters being red at a second temperature which is greater than said first temperature;

said letters being black at a third temperature which is greater than said second temperature; and said colors providing a graded warning upon said sign, with levels of danger depending on the color which the letters display.

16. The optical temperature indicator of claim 15, wherein said second vitreous enamel appears yellow at room temperature.

17. The optical temperature indicator of claim 16, wherein said first vitreous enamel comprises a glass material.

18. The optical temperature indicator of claim 17, wherein said second vitreous enamel comprises a glass material.

* * * * *